United States Patent [19]
Takahashi et al.

[11] Patent Number: 4,884,051
[45] Date of Patent: Nov. 28, 1989

[54] SEMICONDUCTOR DIFFUSION TYPE FORCE SENSING APPARATUS

[75] Inventors: Junichi Takahashi, Yokohama; Daisuke Kosaka, Takarazuka; Hirotoshi Eguchi, Yokohama; Shoji Matsumoto, Minoo; Takashi Akahori, Yokohama; Hiroshi Yamazaki, Tokyo; Kouji Izumi, Yokohama, all of Japan

[73] Assignee: Ricoh Company, Ltd., Tokyo, Japan

[21] Appl. No.: 215,412

[22] Filed: Jul. 5, 1988

[30] Foreign Application Priority Data

Jul. 8, 1987 [JP] Japan .................. 62-170498
Sep. 18, 1987 [JP] Japan .................. 62-234042

[51] Int. Cl.$^4$ .................. G01L 1/22; H01L 27/20
[52] U.S. Cl. .................. 338/4; 357/26
[58] Field of Search .................. 338/2, 4; 357/26, 73; 73/720, 721, 726, 727

[56] References Cited
U.S. PATENT DOCUMENTS

| | | | |
|---|---|---|---|
| 4,400,681 | 8/1983 | Brown et al. | 338/4 |
| 4,439,752 | 3/1984 | Starr | 338/4 |
| 4,672,411 | 6/1987 | Shimizu et al. | 357/26 |

FOREIGN PATENT DOCUMENTS

153173  8/1985  Japan.
221288 11/1985  Japan.

Primary Examiner—Donald A. Griffin
Attorney, Agent, or Firm—Oblon, Spivak, McClelland, Maier & Neustadt

[57] ABSTRACT

A semiconductor diffusion type force sensing apparatus includes a plate-like semiconductor substrate formed by a single crystal material, and a plurality of sensing elements each constituted by a substantially rectangular impurity-diffused region formed in the semiconductor substrate. The sensing elements have an electric resistance variable in accordance with a deformation thereof due to an external force exerted on the semiconductor substrate. The sensing elements are arranged in a direction in which a longitudinal direction of each of the sensing elements coincides with a crystal orientation of the semiconductor substrate having an external value of a longitudinal piezoresistance coefficient of the impurity-diffused region.

43 Claims, 8 Drawing Sheets

$(10^{-12} cm^2/dyne)$

$(10^{-12} cm^2/dyne)$

SEMICONDUCTOR DIFFUSION TYPE FORCE SENSING APPARATUS

BACKGROUND OF THE INVENTION

The present invention generally relates to a semiconductor diffusion type force sensing apparatus, and in particular to a semiconductor diffusion type force sensing apparatus which may be suitably used as a force sensing sensor built in robots and two- or three-dimensional input devices which serve as man-machine interfaces.

A conventional force sensing apparatus includes a strain producing body which is elastically deformed when an external force is applied thereto, and a plurality of sensing elements formed on the body and having an electric resistance which changes in accordance with a deformation of the body. This apparatus takes out a change of the electric resistance as an electric signal of those sensing elements to sense the applied external force.

A semiconductor diffusion type force sensing apparatus is one of the typical force sensing apparatuses. For example, the Japanese Laid-Open Application No. 221288/1985 has disclosed a semiconductor diffusion type force sensing apparatus, in which a plurality of sensing elements are formed on a flat plane of a strain producing substrate formed by a single crystal of silicon by a semiconductor planar process. The strain producing substrate is a flat plate ring having a regular octagon shape which is made of a single crystal of silicon. An external force is exerted on a surface of the strain producing substrate, and a two-dimensional distribution of three components Fx, Fy and Fz of the external force can be detected in accordance with change of the resistances of the sensing elements in response to the external force.

However, a procedure of cutting out the flat plate ring having the shape of a regular octagon from the silicon single crystal must be performed by using a combination of a dicing cut process, a laser process, an etching process and so on. Hence, the cutting-out procedure is very complex.

In order to overcome the above disadvantage of the conventional art, a semiconductor diffusion type force sensing apparatus has been proposed in the Japanese Patent Application No. 259049/1986 filed on Oct. 30, 1986 entitled "A FORCE DETECTING APPARATUS", the assignee of which is the same as the assignee of the present invention. According to this application, a plurality of sensing elements are obtained by forming p-type impurity diffused regions in an n-type silicon single crystal having the {110} plane. The sensing elements are aligned in X and Y axial directions which are orthogonal to each other. The X and Y axial directions have an angle of 45° with respect to the [110] axis. The aligned sensing elements are mutually connected to form a bridge circuit.

However, the above force sensing apparatus cannot detect, with a high accuracy, a direction and a magnitude of the applied external force. This is because the direction of a maximum current flow through the sensing element does not coincide with the direction in which an extremal value of the piezoresistance coefficient is obtained.

Still another conventional semiconductor diffusion type force sensing apparatus has been proposed in the Japanese Laid-Open Patent Application No. 153173/1985. The disclosed force sensing apparatus utilizes the {111} plane of a p-type silicon region formed in an n-type silicon substrate (wafer) having a ring shape. That is, a plurality of sensing elements are provided by the p-type silicon {111} plane portions formed on a surface of the ring-shaped substrate. An external force is applied to a surface perpendicular to the surface having the sensing elements. The sensitivity with respect to the p-type silicon {111} plane does not depend on a crystal orientation thereof. Therefore, dispersion in the sensitivity among the sensing elements can be reduced.

However, it is very difficult to produce the ring-shaped semiconductor substrate. Additionally, as described in the above-identified laid-open application, the sensing elements can be suitably obtained by only the p-type silicon {111} plane. In other words, the n-type silicon {001} plane, n-type silicon {011} plane, p-type silicon {001} plane, p-type silicon {211} plane and the like are not suitable for forming the sensing elements. Moreover, the silicon substrate is designed so that an external force is exerted on a flat plane of the ring-shaped silicon substrate which is perpendicular to the sensing plane on which the sensing elements are arranged. For this reason, it is difficult to support the ring-shaped silicon substrate without affecting a deformation thereof due to the external force.

SUMMARY OF THE INVENTION

Accordingly, a general object of the present invention is to provide a novel and useful semiconductor diffusion type force sensing apparatus in which the above-described disadvantages have been eliminated.

A more specific object of the present invention is to provide a semiconductor diffusion type force sensing apparatus capable of detecting, with a higher accuracy, a direction and a magnitude of a force applied thereto.

The above objects of the present invention are achieved by a semiconductor diffusion type force sensing element comprising a plate-like semiconductor substrate formed by a single crystal material; and a plurality of sensing elements each constituted by a substantially rectangular impurity-diffused region formed in the semiconductor substrate. The sensing elements have an electric resistance which is variable in accordance with a deformation thereof due to an external force exerted on the semiconductor substrate. The sensing elements are arranged so that a longitudinal direction of each of the sensing elements coincides with a crystal orientation of the semiconductor substrate having an extremal value of a longitudinal piezoresistance coefficient of the impurity-diffused region.

Other objects, features and advantages of the present invention will become apparent from the following detailed description when read in conjunction with the accompanying drawings.

DETAILED DESCRIPTION

To facilitate the understanding of the present invention, a description is first given of a conventional semiconductor diffusion type force sensing apparatus.

Figure 1:
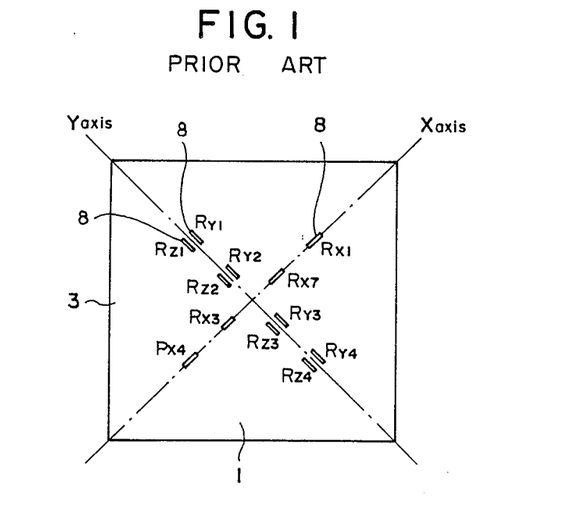
FIG. 1 is a plan view of an essential part of a conventional semiconductor diffusion type force sensing apparatus.
Figure 2:
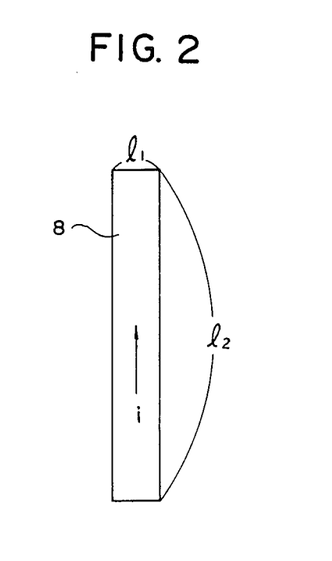
FIG. 2 is a view for explaining a shape of a sensing element which may be used in the apparatus shown in FIG. 1.

Referring to FIG. 1, twelve sensing elements are arranged on a {110} plane 3 of an n-type silicon substrate 1. Each of the sensing elements 8 is obtained by forming a p-type impurity-diffused region in the n-type silicon substrate 1 by a silicon planar process. As shown in FIG. 2, each of the sensing elements 8 has a rectangular shape in which a longitudinal length $l_2$ thereof is much longer than a transverse length $l_1$, i.e., $l_1 << l_2$. Four sensing elements 8 labelled $R_{X1}$, $R_{X2}$, $R_{X3}$ and $R_{X4}$ are aligned on the X axis, and sensing elements 8 labelled $R_{Y1}$, $R_{Y2}$, $R_{Y3}$ and $R_{Y4}$ are aligned along the Y axis orthogonal to the X axis. Further, four sensing elements $R_{Z1}$, $R_{Z2}$, $R_{Z3}$ and $R_{Z4}$ are aligned in the Y axial direction. The sensing elements $R_{X1}$, $R_{X2}$, $R_{X3}$ and $R_{X4}$ are mutually connected so as to form a bridge circuit. Similarly, the sensing elements $R_{Y1}$, $R_{Y2}$, $R_{Y3}$ and $R_{Y4}$ are mutually connected so as to form a bridge circuit, and the sensing elements $R_{Z1}$, $R_{Z2}$, $R_{Z3}$ and $R_{Z4}$ are also mutually connected so as to form a bridge circuit.

Figure 3:
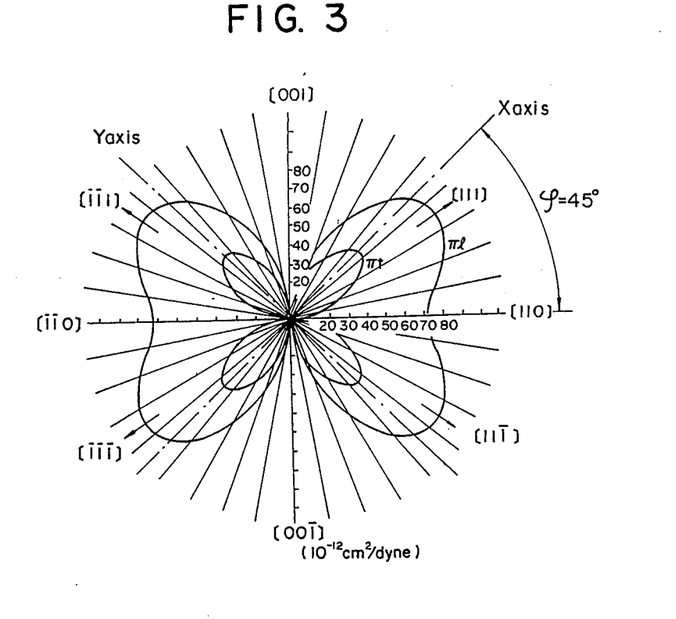
FIG. 3 is a graph showing the longitudinal piezoresistance coefficient and the traverse piezoresistance coefficient of a p-type impurity-diffused region in a silicon substrate used in the conventional apparatus shown in FIG. 1.

FIG. 3 shows a graph showing piezoresistance coefficients of the {110} plane of the p-type silicon region which serves as the sensing element. The direction of alignment of the sensing elements $R_{X1}$ through $R_{X4}$ is at an angle $\phi$ of 45° with respect to the [110] axis.

When an external force is exerted on the force sensing apparatus shown in FIG. 1, an internal stress is produced in the silicon substrate 1. The stress results in a corresponding strain in the strain producing body 1 and therefore the sensing elements 8 are deformed. As a result, the resistances of the sensing elements 8 change due to the piezoresistance effect. A resistance variation $\Delta R$ which occurs when the stress exists in the strain producing body 1 is expressed as follows:

$$\Delta R/R = \pi_l \cdot \sigma_l + \pi_t \cdot \sigma_t + \pi_s \cdot \sigma_s \quad (1)$$

where $\pi_l$: a longitudinal piezoresistance coefficient,
$\pi_t$: a transverse piezoresistance coefficient,
$\pi_s$: a shearing piezoresistance coefficient,
$\sigma_l$: a longitudinal stress,
$\sigma_t$: a transverse stress, and
$\sigma_s$: a sharing stress.

In the structure of FIG. 1, the sharing stress is much smaller than the stresses in the longitudinal and transverse directions. Therefore, the shearing stress is neglected in the following description. In addition, as described before, the transverse piezoresistance coefficient and the transverse stress shown in formula (1) may be neglected because $l_1 << l_2$. Therefore, formula (1) can be rewritten as follows:

$$\Delta R/R = \pi_l \cdot \sigma_l \quad (2)$$

Figure 4:
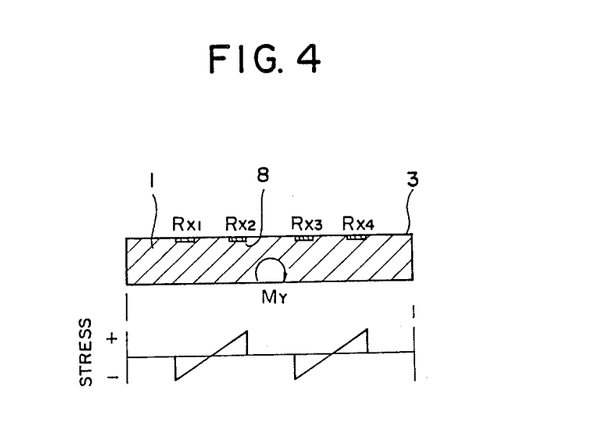
FIG. 4 is a view for explaining a strain produced in the substrate due to an external force which is exerted thereon along the X axial direction.

At this time, if an external force in the X axial direction is exerted on the substrate 1, a moment My around the Y axis is generated and the resistances of the sensing elements 8 are changed as shown in FIG. 4. That is, $R_{X1}$ and $R_{X3}$ is decreased,
$R_{X2}$ and $R_{X4}$ is increased,
$R_{Y1}$, $R_{Y2}$, $R_{Y3}$ and $R_{Y4}$ do not change,
$R_{Z1}$ and $R_{Z3}$ is decreased, and
$R_{Z2}$ and $R_{Z4}$ is increased.

Figure 5:
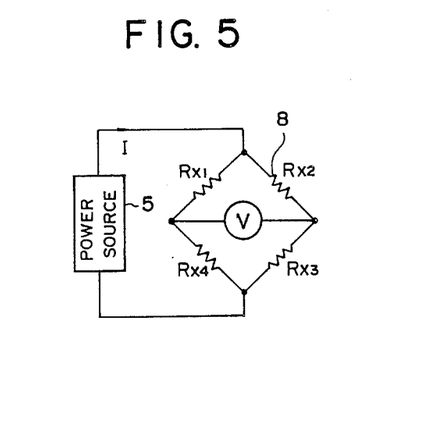
FIG. 5 is a circuit diagram for measuring a direction and magnitude of an external force which is exerted on the substrate along the X axial direction.

For example, a variation of the resistance in the X axial direction can be measured by a measurement system as shown in FIG. 5. The sensing elements $R_{X1}$, $R_{X2}$, $R_{X3}$ and $R_{X4}$ are mutually connected as shown so as to form a bridge circuit. A voltage meter V is connected across a connection between the sensing elements $R_{X1}$ and $R_{X4}$ and a connection between the sensing elements $R_{X2}$ and $R_{X3}$. A power source 5 is connected across a connection of the sensing elements $R_{X1}$ and $R_{X2}$ and a connection of the sensing elements $R_{X3}$ and $R_{X4}$. When the moment My is generated, a voltage output indicated by the voltage meter V can be represented as follows:

$$V = (-R_{X1} \cdot R_{X3} + R_{X2} \cdot R_{X4})$$
$$I/(R_{X1} + R_{X2} + R_{X3} + R_{X4}) \quad (3)$$

For the sake of simplicity, assuming that $R_{X1} = R_{X2} = R_{X3} = R_{X4}$, then the output voltage V in formula (3) becomes zero. Further, assuming that an increase of the resistance in response to the occurrence of the moment My is represented by $\Delta R$ and a decrease of the resistance is represented by $-\Delta R$, then the output resulting from the generated moment My is as follows (where the current I has a constant value):

$$\begin{aligned} V &= -(R - \Delta R)^2 + (R + \Delta R)^2 \cdot I/[(R - \Delta R) + (R + \\ & \quad \Delta R) + (R - \Delta R) + (R + \Delta R)] \\ &= +4R \cdot \Delta R \cdot I/4R \\ &= \Delta R \cdot I \end{aligned} \quad (4)$$

That is the variation $\Delta V$ in the output voltage V resulting from the generated moment My is $$\Delta V = \Delta R \cdot I \quad (5)$$

Figure 6:
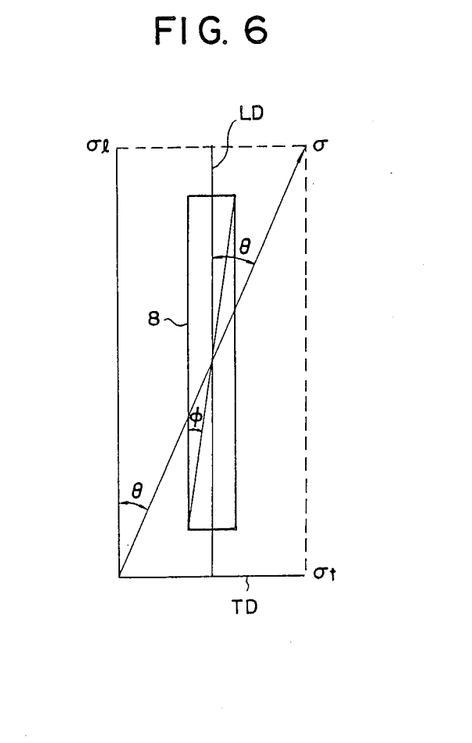
FIG. 6 is a view showing a state of a strain produced in the substrate.

It can be seen from formula (5) that the output voltage V is determined depending on the variation of the piezoresistance $\Delta R$. Now assuming that as shown in FIG. 6, a stress $\sigma$ is applied to one sensing element 8 at an angle $\theta$ with respect to a longitudinal direction LD, the stress $\sigma$ may be divided into two components, one of which is the stress $\sigma_l$ in the longitudinal direction and the other of which is the stress $\sigma_t$ in the transverse direction TD. That is, $$\sigma_l = \sigma \cos\theta$$

$$\sigma_t = \sigma \sin\theta. \tag{6}$$

Formula (2) shows that the variation of the resistance $\Delta R$ has a maximum value and also the variation of the output $\Delta V$ has a maximum value when $\theta = 0$. That is, from formulas (2) and (6), the following formula can be obtained:

$$\Delta R/R = \pi_l \cdot \sigma_l \tag{7}$$
$$= \pi_l \cdot \cos\theta$$

Further, because $\pi_l = \pi_l(\phi)$ $$\Delta R/R = \pi_l(\phi)\sigma\cos\theta \tag{8}$$

Figure 7:
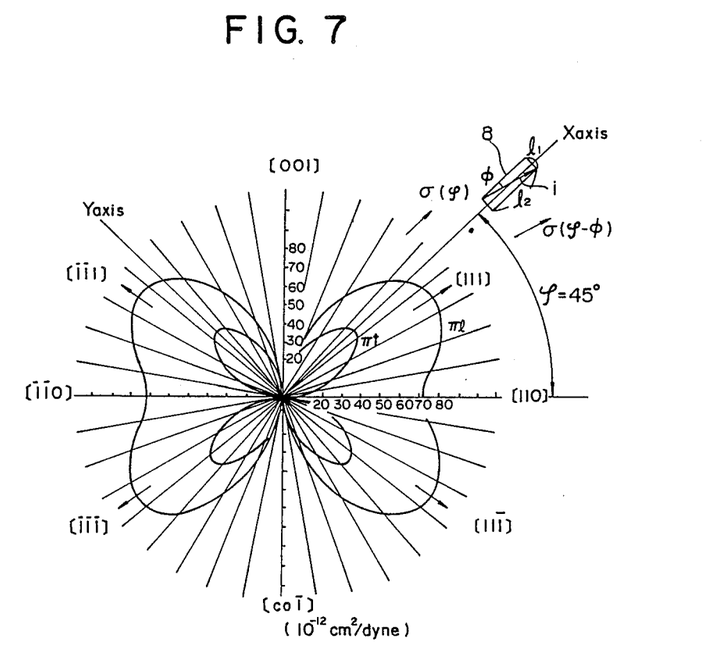
FIG. 7 is a view for explaining a disadvantage of the conventional apparatus.

As described before, each of the sensing elements 8 have the shape such that $l_1 < < l_2$, and accordingly assuming that a current flows only in the longitudinal direction LD, then $\pi_l = \pi_l(\phi) = $ (a constant value), and therefore the above-described relationship that the variation of the resistance $\Delta R$ has a maximum value and also the variation of the output $\Delta V$ has a maximum value when $\theta = 0$, comes into respect to the [110] axis as shown in FIG. 7, and $\pi_l(\phi)$ denotes the longitudinal piezoresistance coefficient $\pi_l$ as a function of an angle of $\phi$.

However, a ratio of the length $l_1$ with respect to the length $l_2$ of the sensing element 8 is finite, and therefore an angle $\Phi$ of a diagonal line with respect to the longitudinal end of the sensing element 8 is not zero, as shown in FIG. 6. That is, a current may flow through the sensing element 8 within an angular range from an angle $(\phi - \Phi)$ to $(\phi + \Phi)$. In this case, as seen from FIG. 7, the longitudinal piezoresistance coefficient $\pi(\phi - \Phi)$ with respect to the current flow in the direction having the angle $(\phi - \Phi)$ is larger than the longitudinal piezoresistance coefficient $\pi_l(\phi)$ with respect to the current flow at angle $\phi$. For this reason, the resistance variation obtained when the stress $\sigma_l(\phi - \Phi)$ acts in the $(\phi - \Phi)$ direction, i.e. $\Delta R(\phi - \Phi)$ has a value larger than that obtained when the stress $\sigma_l(\phi)$ acts in the $\Phi$ direction. In other words, if $$\sigma_l(\phi) = \sigma_l(\phi - \Phi), \text{ and}$$

$$\pi_l(\phi - \Phi) > \pi_l(\phi),$$

the following result can be obtained:

$$\pi_l(\phi) \cdot \sigma_l(\phi) < \pi_l(\phi - \Phi) \cdot \sigma_l(\phi - \Phi)$$

$$\pi_l(\phi) \cdot \sigma_l(\phi) = \Delta R(\phi)/R$$

$$\pi_l(\phi - \Phi) \cdot \sigma_l(\phi - \Phi) = \Delta R(\phi - \Phi)/R$$

$$-4 R(\phi) < \Delta R(\phi - \Phi).$$

It can be seen from the above result that $\Delta R$ obtained when the stress is exerted in a direction at an angle of $(\phi - \Phi)$ has a value larger than that obtained when the stress is exerted in a direction at an angle of $\phi = 45°$. As a result, the output voltage V at an angle of $(\phi - \Phi)$ has a value larger than that for an angle of $\phi = 45°$. As described above, the sensing elements 8 with respect to the moment My are aligned at an angle of 45 with respect to the [110] axis of the {110} plane of the p-type silicon region. Therefore, an angle $\theta$ at which the maximum output voltage change $\Delta V$ can be obtained deviates from the direction of the alignment of the sensing elements $R_{X1}$, $R_{X2}$, $R_{X3}$ and $R_{X4}$ by $(\phi - \Phi)$ towards the [110] axis. An angle at which the maximum voltage change $\Delta V$ is obtained was measured by using the sensing elements 8 each having a size such that $l_1:l_2 = 1:20$. In the experiment, the maximum V was obtained in a direction at an angle of 42° with respect to the [110] axis. This experimental result coincides with the following relationship:

$$\phi = \tan^{-1} 0.05 = 3°$$

That is, in the structure of FIG. 7, a deviation $\phi$ in angle between the X axial direction corresponding to the alignment of the sensing elements 8 and the angle at which the maximum output $\Delta V$ is obtained, is determined by the following formula:

$$\phi = \tan^{-1}(l_1/l_2)$$

It can be seen from the above relationship that a deviation may reduce as the ratio $(l_1/l_2)$ decrease. However, in order to obtain the deviation $\phi$ having a value of 0.1°, the following condition must be satisfied:

$$l_1 : l_2 = 1 : 600$$

It is practically impossible to produce sensing elements having the above ratio from the viewpoint of the current knowledge of the semiconductor field in which a minimum size of a diffusion region obtainable without difficulty is in the order of 3 [μm]. Therefore if $l_1 = 3$ [μm], $l_2$ must be set equal to 1.8 [mm]. This value of the length $l_2$ is extremely great, and a silicon single crystal having a size of 30 by 30 [mm×mm] is required for fabricating a force sensing apparatus by using the sensing elements having the above size.

From the above viewpoint, according to the present invention described below, sensing elements are arranged at an angle at which an extremal value (a maximum or minimum value in a vicinity of axes on which the sensing elements are arranged) of the longitudinal piezoresistance coefficient is obtained.

Figure 8:
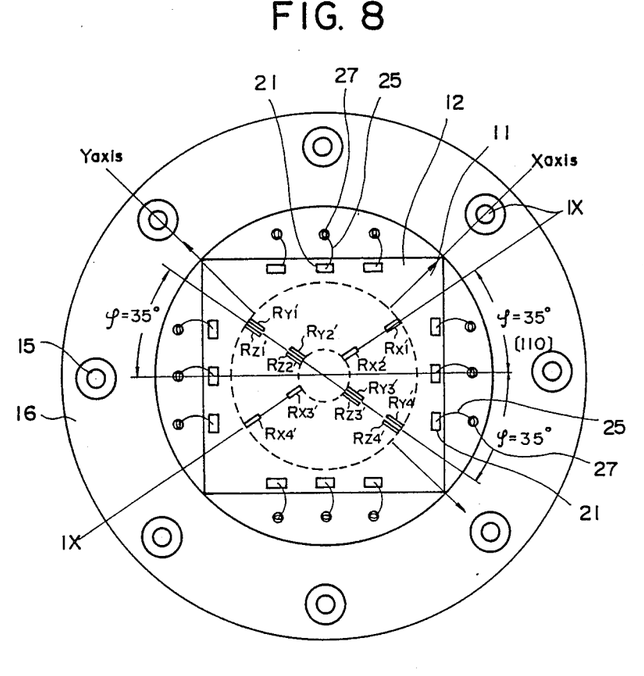
FIG. 8 is a plan view of an embodiment of the present invention.
Figure 9:
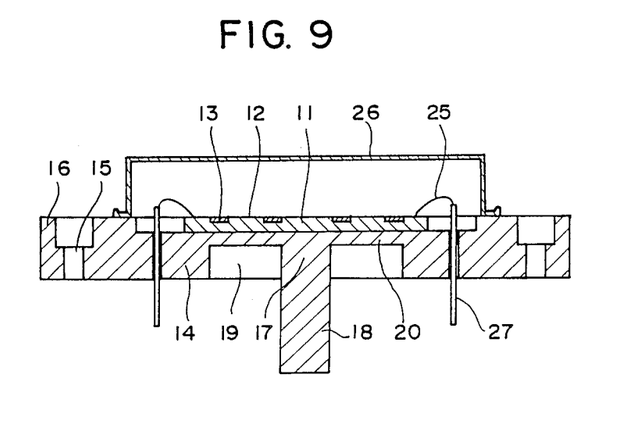
FIG. 9 is an elevational cross sectional view taken along a line IX—IX shown in FIG. 8.

A description is now given of a first embodiment of the present invention with reference to FIGS. 8 and 9. A silicon single crystal substrate 11 is an n-type {110} silicon wafer. The silicon single crystal substrate 11 has a generally square shape. The {110} plane of the substrate 11 is a force sensing plane 12, on which twelve sensing elements 13 are arranged. The sensing elements 13 may be formed by implanting and diffusing a p-type impurity such as boron (B) in the substrate 11. Therefore, the sensing elements 13 are formed by p-type impurity-diffused regions. Four sensing elements $R'_{X1}$, $R'_{X2}$, $R'_{X3}$ and $R'_{X4}$ are arranged at an angle of 35° with respect to the [110] axis so that the longitudinal direction of the aligned sensing elements is identical to the direction having an angle of 35° with respect to the [110] axis. In other words, the sensing elements $R'_{X1}$, $R'_{X2}$, $R'_{X3}$ and $R'_{X4}$ are arranged on the [111] and [1̄1̄1] axes of the {110} plane. That is, the sensing elements $R'_{X1}$, $R'_{X2}$, $R'_{X3}$ and $R'_{X4}$ are arranged at an angle where an extremal value of the longitudinal piezoresistance coefficient $\pi_l$ is obtained. Four sensing elements $R'_{Y1}$, $R'_{Y2}$, $R'_{Y3}$ and $R'_{Y4}$ as well as four sensing elements $R'_{Z1}$, $R'_{Z2}$, $R'_{Z3}$ and $R'_{Z4}$ are arranged at an angle of $-35$ with respect to the [110] axis so that the longitudinal direction of each sensing elements coincides with the direction at an angle of $-35°$ with respect to the [110] axis. In other words, these sensing elements are arranged in the $[\bar{1}1\bar{1}]$ and $[11\bar{1}]$ axes. That is, the sensing elements $R'_{Y1}$, $R'_{Y2}$, $R'_{Y3}$ and $R'_{Y4}$, and sensing elements $R'_{Z1}$, $R'_{Z2}$, $R'_{Z3}$ and $R'_{Z4}$ are arranged at an angle where an extremal value of the longitudinal piezoresistance coefficient $\pi_l$ is obtained.

The single crystal substrate 11 is supported by a strain producing member 14 which has a function of reinforcing the single crystal substrate 11. The strain producing member 14 has a disc-shaped structure, and a peripheral portion thereof is used as a supporting portion 16 in which a plurality of tapped holes 15 are arranged at an equal interval. The strain producing member 14 has a force receiving portion 18 located at the center thereof and is integrally formed therewith. A portion of the strain producing member 14 around the force receiving portion 18 is recessed so that a recess portion 19 is formed. Thereby, an elastic deformation plane 20 is formed by a thin portion of the strain producing member 14. The single crystal substrate 11 adheres to the elastic deformation plane 20 of the strain producing member 14. The sensing elements $R'_{X1}$, $R'_{X2}$, $R'_{X3}$ and $R'_{X4}$ are mutually connected by a wiring pattern (not shown) formed on the surface of the single crystal substrate 11 so as to form a bridge circuit. Similarly, the sensing elements $R'_{Y1}$, $R'_{Y2}$, $R'_{Y3}$ and $R'_{Y4}$ are mutually connected so as to form a bridge circuit. Also, the sensing elements $R'_{Z1}$, $R'_{Z2}$, $R'_{Z3}$ and $R'_{Z4}$ are mutually connected so as to form a bridge circuit. A plurality of connection pads 21 are formed on the single crystal substrate 11, and are connected to the wiring patterns (not shown). A plurality of terminal pins 27 which penetrate the strain producing member 14 are provided for establishing a connection with an external circuit such as the voltage meter V and power source 5 shown in FIG. 5. The terminal pins 27 are connected to the corresponding pads 21 by bonding wires 25. A cap 26 is provided for protecting the single crystal substrate 11 against an outside air. The cap 26 is fastened on the strain producing member 14 by an adhesive.

When an external force is exerted on the force receiving portion 18, the strain producing member 14 is deformed, and correspondingly a strain is generated in the single crystal substrate 11. In response to the strain produced in the single crystal substrate 11, a variation of the resistance $\Delta R$ occurs. As described before, the sensing elements 13 are arranged in the directions where extremal values of the longitudinal piezoresistance coefficient $\pi_l$ are obtained. Therefore, the sensing elements 8 can sense, with an increased sensitivity, corresponding force components of the applied external force. In addition, as will be seen from FIG. 7, the longitudinal piezoresistance coefficient curve is substantially symmetrical about imaginary lines indicating directions having angles of $\pm 35°$ with respect to the [110] axis. It is to be noted that the longitudinal piezoresistance coefficient curve is not symmetrical about the X and Y axes. Moreover, it is to be appreciated that according to the present embodiment, a smooth variation of the longitudinal piezoresistance coefficient $\pi_l$ can be obtained in the vicinity of intersecting points where the longitudinal piezoresistance coefficient curve intersects the axes at angles of $\pm 35°$ with respect to the [110] and $[\bar{1}10]$ axes. It should be noted that the variation in the longitudinal piezoresistance coefficient $\pi_l$ extremely changes in the vicinity of the X and Y directions along which the sensing elements are arranged in the conventional apparatus as described previously with reference to FIGS. 1 and 7. As a result, the present embodiment makes it possible to detect a direction and its magnitude of the external force with a high accuracy, compared with the conventional force sensing apparatus. If it is desired to obtain magnitudes of force components in the X and Y directions, an appropriate coordinate calculation may be subjected to the measurement results obtained by the present embodiment.

Figure 10:
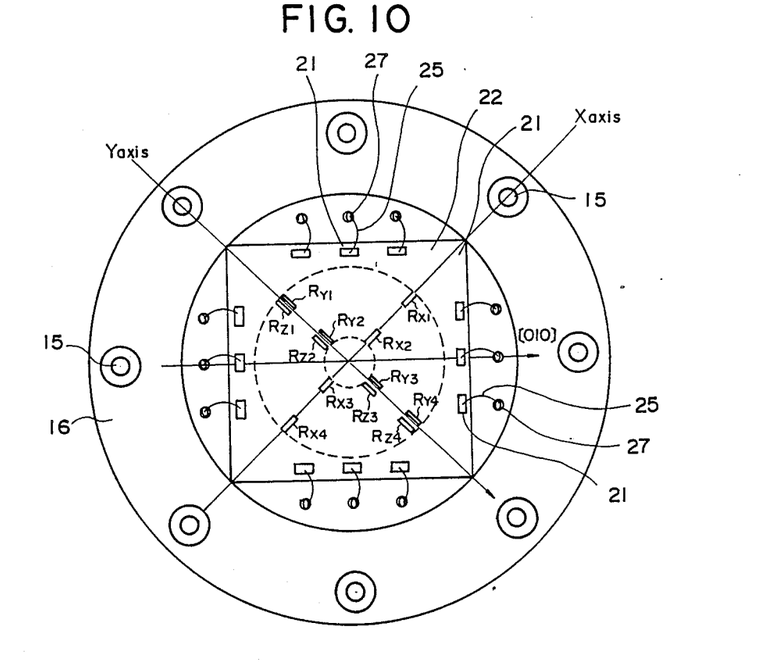
FIG. 10 is a plan view of a second embodiment of the present invention.
Figure 11:
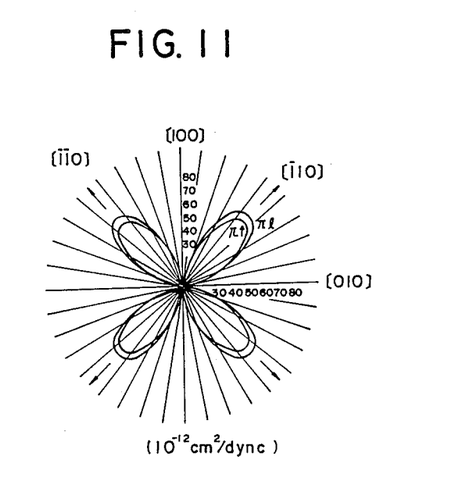
FIG. 11 is a graph showing the longitudinal and traverse piezoresistance coefficients of a {001} wafer which is used in the second embodiment of FIG. 10.

A description is given of a second embodiment of the present invention with reference to FIGS. 10 and 11. One of the essential features of the second embodiment is that a sensing element 21 is formed by the {001} plane of a p-type silicon region. The sensing element 21 is obtained by forming a p-type impurity-diffused region in an n-type silicon wafer having the {001} plane 22. A crystal orientation dependence of the longitudinal piezoresistance coefficient $\pi_l$ of the {001} plane 22 of p-type silicon is shown in FIG. 11. As shown, the longitudinal piezoresistance coefficient having the extremal value can be obtained in $[\bar{1}10]$ and $[\bar{1}\bar{1}0]$ axes, which substantially correspond to the X and Y directions. Referring back to FIG. 10, the four sensing elements $R_{X1}$, $R_{X2}$, $R_{X3}$ and $R_{X4}$ are arranged on the $[\bar{1}10]$ axis, and the four sensing elements $R_{Y1}$, $R_{Y2}$, $R_{Y3}$ and $R_{Y4}$ are arranged on the $[\bar{1}10]$ axis. Four sensing elements $R_{Z1}$, $R_{Z2}$, $R_{Z3}$ and $R_{Z4}$ are also arranged on the $[\bar{1}\bar{1}0]$ axis. Other structural elements of the second embodiment are the same as those of the first embodiment. In other words, the sensing elements of the second embodiment are arranged in the directions where the extremal values of the output voltage change $\Delta V$ are obtained. Therefore, the sensing elements can sense, with a high accuracy, corresponding stress components generated by the applied external force. Additionally, the longitudinal piezoresistance coefficient curve shown in FIG. 11 is substantially symmetrical about to the X and Y axes and is smoothly changed in the vicinity of axes $[\bar{1}10]$ and $[\bar{1}\bar{1}0]$ (X and Y axes) on which the extremal values thereof can be obtained, as a function of an angle indicating the crystal orientation. Therefore, it becomes possible to detect the direction of the external force and its magnitude with a high accuracy.

In place of the {001} plane of the p-type silicon region used in the second embodiment, the following silicon regions shown in TABLE 1 can be used as the sensing elements.

TABLE 1

| Material | Surface Orientation | Directions of Arrangement Sensing Elements | |
|---|---|---|---|
| n-type Si | {011} | $[01\bar{1}]$ | [100] |
| n-type Si | {001} | [010] | [100] |
| n-type Si | {001} | [110] | $[\bar{1}10]$ |
| p-type Si | {211} | $[0\bar{1}1]$ | $[\bar{1}1\bar{1}]$ |

In the case where the sensing elements are formed by n-type silicon regions, a p-type silicon substrate is used. On the other hand, an n-type silicon substrate is used in the case where the sensing elements are formed by p-type silicon regions. Semiconductor diffusion type force sensing apparatuses provided by the above silicon wafers have the same advantages as those for the second embodiment described above.

Figure 12:
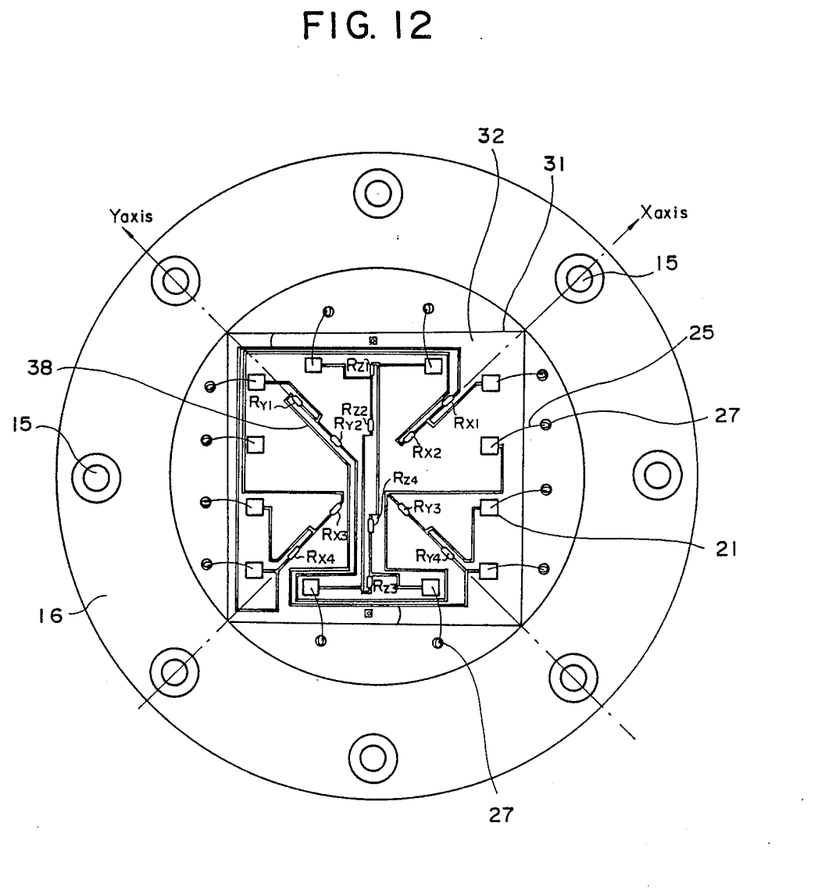
FIG. 12 is a plan view of a third embodiment of the present invention.

Further, a {111} plane of a p-type silicon region formed in an n-type silicon single crystal may be used. A semiconductor diffusion type force sensing apparatus illustrated in FIG. 12 employs an n-type silicon single crystal 31 having the {111} plane. A reference numeral 32 indicates the {111} plane of the n-type silicon wafer 31. Sensing elements $R_{X1}$, $R_{X2}$, $R_{X3}$ and $R_{X4}$ are arranged in the X axial direction. Sensing elements $R_{Y1}$, $R_{Y2}$, $R_{Y3}$ and $R_{Y4}$ are arranged in the Y axial direction. Sensing elements $R_{Z1}$, $R_{Z2}$, $R_{Z3}$ and $R_{Z4}$ are arranged at an angle of 45° with respect to the X axial direction.

Figure 13:
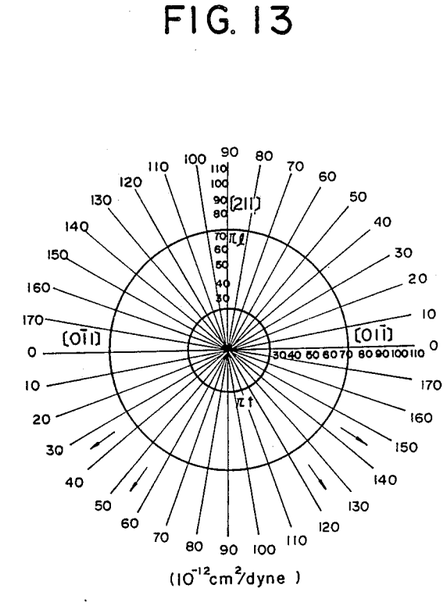
FIG. 13 is a graph showing the longitudinal and traverse piezoresistance coefficients of a {111} wafer which is used in the third embodiment of FIG. 12.

FIG. 13 shows piezoresistance coefficients of the {111} plane of p-type silicon which provides the sensing element. As shown, the longitudinal piezoresistance coefficient $\pi_l$ is uniform irrespective of an orientation of the crystal axis. Similarly, the {111} plane of n-type silicon has piezoresistance coefficient curves similar to those for the {111} plane of p-type silicon. Therefore, an n-type diffused region formed in a p-type silicon single crystal substrate of the {111} plane can be used as a sensing element.

The present invention is not limited to the above embodiments, and variations and modifications may be made without departing from the scope of the present invention. For example, the present invention is not limited to the silicon wafers described before. However, it is essential to arrange the sensing elements in a direction in which the longitudinal axis of the sensing elements coincides with a crystal orientation having an extremal value of the longitudinal piezoresistance coefficient.

What is claimed is:

1. A semiconductor diffusion type force sensing apparatus comprising:
   a plate-like semiconductor substrate formed by a single crystal material; and
   a plurality of sensing elements each constituted by a substantially rectangular impurity-diffused region formed in the semiconductor substrate, said sensing element including a first group of sensing elements and a second group of sensing elements,
   the sensing elements having an electric resistance variable in accordance with a deformation thereof due to an external force exerted on the semiconductor substrate,
   said first group of sensing elements being aligned in a first direction such that a longitudinal direction of each of the sensing elements related to the first group coincides with a first crystal orientation of the semiconductor substrate having an extremal value of a longitudinal piezoresistance coefficient of the impurity-diffused region,
   said second group of sensing elements being aligned in a second direction such that a longitudinal direction of each of the sensing elements related to the second group coincides with a second crystal orientation of the semiconductor substrate having an external value of a longitudinal piezoresistance coefficient of the impurity-diffused region,
   said second direction being different from said first direction, the alignment of said first group of sensing elements being arranged so as to intersect the alignment of said second group of sensing elements.

2. A semiconductor diffusion type force sensing apparatus as claimed in claim 1 wherein the longitudinal piezoresistance coefficient has a characteristic such that it changes smoothly in the vicinity of the longitudinal direction of each of the sensing elements as a function of an angle indicating the crystal orientation.

3. A semiconductor diffusion type force sensing apparatus as claimed in claim 1, wherein a curve of the longitudinal piezoresistance coefficient as a function of an angle indicating the crystal orientation is symmetrical about an axis of the crystal orientation having the extremal value.

4. A semiconductor diffusion type force sensing apparatus as claimed in claim 5, wherein each of the sensing elements has the {001} plane of n-type silicon, and wherein a part of the plurality of sensing elements are arranged on the [010] axis of the {001} plane, and the remaining sensing elements are arranged on the [$\bar{1}$00] axis thereof.

5. A semiconductor diffusion type force sensing apparatus as claimed in claim 1, wherein each of the sensing elements has the {011} plane of n-type silicon, and wherein a part of the plurality of sensing elements are arranged on the [01$\bar{1}$] axis of the {011} plane, and the remaining sensing elements are arranged on the [$\bar{1}$00] axis thereof.

6. A semiconductor diffusion type force sensing apparatus as claimed in claim 1, wherein each of the sensing elements has the {001} plane of n-type silicon, and wherein a part of the plurality of sensing elements are arranged on the [$\bar{1}$10] axis of the {001} plane, and the remaining sensing elements are arranged on the [$\bar{1}\bar{1}$0] axis thereof.

7. A semiconductor diffusion type force sensing apparatus as claimed in claim 1, wherein each of the sensing elements has the {001} plane of p-type silicon, and wherein a part of the plurality of sensing elements are arranged on the [$\bar{1}$10] axis of the {001} plane, and the remaining sensing elements are arranged on the [$\bar{1}\bar{1}$0] axis thereof.

8. A semiconductor diffusion type force sensing apparatus as claimed in claim 1, wherein each of the sensing elements has the {211} plane of p-type silicon, and wherein a part of the plurality of sensing elements are arranged on the [0$\bar{1}$1] axis of the {211} plane, and the remaining sensing elements are arranged on the [1$\bar{1}\bar{1}$] axis thereof.

9. A semiconductor diffusion type force sensing apparatus as claimed in claim 1, wherein each of the sensing elements has the {110} plane of p-type silicon, and wherein a part of the plurality of sensing elements are arranged on the [111] axis of the {110} plane, and the remaining sensing elements are arranged on the [$\bar{1}$1$\bar{1}$] axis thereof.

10. A semiconductor diffusion type force sensing apparatus as claimed in claim 1, wherein the semiconductor substrate comprises an n-type {111} silicon wafer, and each of the sensing elements has a {111} plane of a p-type silicon region which is formed in the silicon wafer, and which a part of the sensing elements are arranged in an X axial direction of the silicon wafer and the remaining sensing elements are arranged in a Y axial direction thereof which is orthogonal to the X direction.

11. A semiconductor diffusion type force sensing apparatus as claimed in claim 1, wherein the semiconductor substrate comprises a p-type {111} silicon wafer, and each of the sensing elements has a {111} plane of an n-type silicon region which is formed in the silicon wafer, and which a part of the sensing elements are arranged in an X axial direction of the silicon wafer and the remaining sensing elements are arranged in a Y axial direction thereof which is orthogonal to the X direction.

12. A semiconductor diffusion type force sensing apparatus as claimed in claim 1, wherein the semiconductor substrate is supported by an elastic member, to which an external force is applied.

13. A semiconductor diffusion type force sensing apparatus as claimed in claim 12, wherein the elastic member comprises a projection located at a center of the elastic member, the external force being applied to the projection.

14. A semiconductor diffusion type force sensing apparatus as claimed in claim 1, wherein the alignment of said first group of sensing elements being arranged so as to intersect the alignment of said second group of sensing elements with an angle less than 90°.

15. A semiconductor diffusion type force sensing apparatus comprising:
 a plate-like semiconductor substrate formed by a single crystal material; and
 a plurality of sensing elements each constituted by a substantially rectangular impurity-diffused region formed in the semiconductor substrate, said sensing elements including first, second and third groups of sensing elements formed on the same surface of the semiconductor substrate,
 the sensing elements having an electric resistance variable in accordance with a deformation thereof due to an external force exerted on the semiconductor substrate,
 said first group of sensing elements being aligned in a first direction such that a longitudinal direction of each of the sensing elements related to the first group coincides with a first crystal orientation of the semiconductor substrate having an extremal value of a longitudinal piezoresistance coefficient of the impurity-diffused region,
 said second group of sensing elements being aligned in a second direction such that a longitudinal direction of each of the sensing elements related to the second group coincides with a second crystal orientation of the semiconductor substrate having an external value of a longitudinal piezoresistance coefficient of the impurity-diffused region, said second direction being different from said first direction, said second direction being different from said first direction, the alignment of said first group of sensing elements being arranged so as to intersect the alignment of said second group of sensing elements,
 said third group of sensing elements being aligned in a third direction so as to intersect the alignment of said first group of sensing elements and the alignment of said second group of sensing elements.

16. A semiconductor diffusion type force sensing element as claimed in claim 15, wherein the alignment of said first group of sensing elements is arranged so as to intersect the alignment of said second group of sensing elements with an angle equal to 90.

17. A semiconductor diffusion type force sensing apparatus as claimed in claim 15, wherein the longitudinal piezoresistance coefficient has a characteristic such that it changes smoothly in the vicinity of the longitudinal direction of each of the sensing elements as a function of an angle indicating the crystal orientation.

18. A semiconductor diffusion type force sensing apparatus as claimed in claim 15, wherein a curve of the longitudinal piezoresistance coefficient as a function of an angle indicating the crystal orientation is symmetrical about an axis of the crystal orientation having the extremal value.

19. A semiconductor diffusion type force sensing apparatus as claimed in claim 15, wherein each of the sensing elements has the {001} plane of n-type silicon, and wherein a part of the plurality of sensing elements are arranged on the [010] axis of the {001} plane, and the remaining sensing elements are arranged on the [$\bar{1}$00] axis thereof.

20. A semiconductor diffusion type force sensing apparatus as claimed in claim 15, wherein each of the sensing elements has the {011} plane of n-type silicon, and wherein a part of the plurality of sensing elements are arranged on the [01$\bar{1}$] axis of the {011} plane, and the remaining sensing elements are arranged on the [$\bar{1}$00] axis thereof.

21. A semiconductor diffusion type force sensing apparatus as claimed in claim 15, wherein each of the sensing elements has the {001} plane of n-type silicon, and wherein a part of the plurality of sensing elements are arranged on the [$\bar{1}$10] axis of the {001} plane, and the remaining sensing elements are arranged on the [$\bar{1}\bar{1}$0] axis thereof.

22. A semiconductor diffusion type force sensing apparatus as claimed in claim 15, wherein each of the sensing elements has the {001} plane of p-type silicon, and wherein a part of the plurality of sensing elements are arranged on the [$\bar{1}$10] axis of the {001} plane, and the remaining sensing elements are arranged on the [$\bar{1}\bar{1}$0] axis thereof.

23. A semiconductor diffusion type force sensing apparatus as claimed in claim 15, wherein each of the sensing elements has the {211} plane of p-type silicon, and wherein a part of the plurality of sensing elements are arranged on the [0$\bar{1}$1] axis of the {211} plane, and the remaining sensing elements are arranged on the [1$\bar{1}\bar{1}$] axis thereof.

24. A semiconductor diffusion type force sensing apparatus as claimed in claim 15, wherein each of the sensing elements has the {110} plane of p-type silicon, and wherein a part of the plurality of sensing elements are arranged on the [$\bar{1}\bar{1}\bar{1}$] axis of the {100} plane, and the remaining sensing elements are arranged on the [111] axis thereof.

25. A semiconductor diffusion type force sensing apparatus as claimed in claim 15, wherein the semiconductor substrate comprises an n-type {111} silicon wafer, and each of the sensing elements has a {111} plane of a p-type silicon region which is formed in the silicon wafer, and which a part of the sensing elements are arranged in an X axial direction of the silicon wafer and the remaining sensing elements are arranged in a Y axial direction thereof which is orthogonal to the X direction.

26. A semiconductor diffusion type force sensing apparatus as claimed in claim 15, wherein the semiconductor substrate comprises a p-type {111} silicon wafer, and each of the sensing elements has a {111} plane of an n-type silicon region which is formed in the silicon wafer, and which a part of the sensing elements are arranged in an X axial direction of the silicon wafer related to said first axis, and the remaining sensing elements are arranged in a Y axial direction thereof which is related to said second axis and is orthogonal to the X direction.

27. A semiconductor diffusion type force sensing apparatus as claimed in claim 15, wherein the semiconductor substrate is supported by an elastic member, to which an external force is applied.

28. A semiconductor diffusion type force sensing apparatus as claimed in claim 27, wherein the elastic member comprises a projection located at a center of the elastic member, the external force being applied to the projection.

29. A semiconductor diffusion type force sensing apparatus as claimed in claim 15, wherein said semiconductor substrate has a force receiving surface which receives said external force and is opposite to said surface thereof on which said first, second and third sensing elements are formed.

30. A semiconductor diffusion type force sensing apparatus comprising:
a plate-like semiconductor substrate formed by a single crystal material having a first surface which receives an external force, and a second surface parallel to said first surface;
a strain producing member used for reinforcing said semiconductor substrate and fastened to said first surface, said external force being applied to said strain producing member, a deformation caused in said strain producing member due to said external force causing a corresponding deformation in said first surface; and
a plurality of sensing elements each constituted by a substantially rectangular impurity-diffused region formed in the semiconductor substrate, said sensing elements including first, second and third groups of sensing elements formed on the second surface of the semiconductor substrate,
the sensing elements having an electric resistance variable in accordance with the deformation thereof due to the external force exerted on the semiconductor substrate,
said first group of sensing elements being aligned in a first direction such that a longitudinal direction of each of the sensing elements related to the first group coincides with a first crystal orientation of the semiconductor substrate having an extremal value of a longitudinal piezoresistance coefficient of the impurity-diffused region,
said second group of sensing elements being aligned in a second direction such that a longitudinal direction of each of the sensing elements related to the second group coincides with a second crystal orientation of the semiconductor substrate having an external value of a longitudinal piezoresistance coefficient of the impurity-diffused region, said second direction being different from said first direction, said second direction being different from said first direction, the alignment of said first group of sensing elements being arranged so as to intersect the alignment of said second group of sensing elements,
said third group of sensing elements being aligned in a third direction so as to intersect the alignment of said first group of sensing elements and the alignment of said second group of sensing elements.

31. A semiconductor diffusion type force sensing elements as claimed in claim 30, wherein the alignment of said first group of sensing elements is arranged so as to intersect the alignment of said second group of sensing elements with an angle equal to 90°.

32. A semiconductor diffusion type force sensing apparatus as claimed in claim 30, wherein the longitudinal piezoresistance coefficient has a characteristic such that it changes smoothly in the vicinity of the longitudinal direction of each of the sensing elements as a function of an angle indicating the crystal orientation.

33. A semiconductor diffusion type force sensing apparatus as claimed in claim 30, wherein a curve of the longitudinal piezoresistance coefficient as a function of an angle indicating the crystal orientation is symmetrical about an axis of the crystal orientation having the extremal value.

34. A semiconductor diffusion type force sensing apparatus as claimed in claim 30, wherein each of the sensing elements has the {001} plane of n-type silicon, and wherein a part of the plurality of sensing elements are arranged on the [010] axis of the {001} plane, and the remaining sensing elements are arranged on the [$\bar{1}$00] axis thereof.

35. A semiconductor diffusion type force sensing apparatus as claimed in claim 30, wherein each of the sensing elements has the {011} plane of n-type silicon, and wherein a part of the plurality of sensing elements are arranged on the [01$\bar{1}$] axis of the [$\bar{1}$00] axis thereof.

36. A semiconductor diffusion type force sensing apparatus as claimed in claim 30, wherein each of the sensing elements has the {001} plane of n-type silicon, and wherein a part of the plurality of sensing elements are arranged on the [$\bar{1}$10] axis of the {001} plane, and the remaining sensing elements are arranged on the [$\bar{1}\bar{1}$0] axis thereof.

37. A semiconductor diffusion type force sensing apparatus as claimed in claim 30, wherein each of the sensing elements has the {001} plane of p-type silicon, and wherein a part of the plurality of sensing elements are arranged on the [$\bar{1}$10] axis of the {001} plane, and the remaining sensing elements are arranged on the [$\bar{1}\bar{1}$0] axis thereof.

38. A semiconductor diffusion type force sensing apparatus as claimed in claim 30, wherein each of the sensing elements has the {211} plane of p-type silicon, and wherein a part of the plurality of sensing elements are arranged on the [0$\bar{1}$1] axis of the {211} plane, and the remaining sensing elements are arranged on the [1$\bar{1}\bar{1}$] axis thereof.

39. A semiconductor diffusion type force sensing apparatus as claimed in claim 30, wherein each of the sensing elements has the {110} plane of p-type silicon, and wherein a part of the plurality of sensing elements are arranged on the [111] axis of the {100} plane, and the remaining sensing elements are arranged on the [111] axis thereof.

40. A semiconductor diffusion type force sensing apparatus as claimed in claim 30, wherein the semiconductor substrate comprises an n-type {111} silicon wafer, and each of the sensing elements has a {111} plane of a p-type silicon region which is formed in the silicon wafer, and which a part of the sensing elements are arranged in an X axial direction of the silicon wafer and the remaining sensing elements are arranged in a Y axial direction thereof which is orthogonal to the X direction.

41. A semiconductor diffusion type force sensing apparatus as claimed in claim 30, wherein the semiconductor substrate comprises an n-type {111} silicon wafer, and each of the sensing elements has a {111} plane of an n-type silicon region which is formed in the silicon wafer, and which a part of the sensing elements are arranged in an X axial direction of the silicon wafer related to said first axis, and the remaining sensing elements are arranged in a Y axial direction thereof which is related to said second axis and is orthogonal to the X direction.

42. A semiconductor diffusion type force sensing apparatus as claimed in claim 30, wherein said strain producing member is formed of elastic material.

43. A semiconductor diffusion type force sensing apparatus as claimed in claim 42, wherein said strain producing member comprises a projection located at the center of the elastic member, the external force being applied to the projection.

* * * * *